United States Patent
Kim et al.

(10) Patent No.: US 12,397,650 B2
(45) Date of Patent: Aug. 26, 2025

(54) ELECTRIFIED VEHICLE AND METHOD OF CONTROLLING SAME

(71) Applicants: Hyundai Motor Company, Seoul (KR); Kia Corporation, Seoul (KR)

(72) Inventors: Sung Su Kim, Whasung-Si (KR); Young Joon Chang, Whasung-Si (KR); Kyung Min Ryu, Whasung-Si (KR); Chan Hee Won, Whasung-Si (KR); Seung Sam Baek, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 187 days.

(21) Appl. No.: 18/384,726

(22) Filed: Oct. 27, 2023

(65) Prior Publication Data
US 2024/0399880 A1  Dec. 5, 2024

(30) Foreign Application Priority Data
May 31, 2023 (KR) .................. 10-2023-0070382

(51) Int. Cl.
*B60L 7/26* (2006.01)
*B60L 15/20* (2006.01)

(52) U.S. Cl.
CPC .............. *B60L 7/26* (2013.01); *B60L 15/2009* (2013.01); *B60L 2240/12* (2013.01); *B60L 2240/423* (2013.01); *B60L 2240/465* (2013.01); *B60L 2250/26* (2013.01)

(58) Field of Classification Search
None
See application file for complete search history.

(56) References Cited

U.S. PATENT DOCUMENTS

| | | | | |
|---|---|---|---|---|
| 12,024,063 | B2* | 7/2024 | Heller | B60T 13/586 |
| 12,090,860 | B2* | 9/2024 | Godo | B60L 15/20 |
| 2018/0093571 | A1* | 4/2018 | Hall | B60L 7/08 |
| 2023/0331229 | A1* | 10/2023 | VanBlon | B60W 40/09 |

\* cited by examiner

*Primary Examiner* — Todd Melton
(74) *Attorney, Agent, or Firm* — MORGAN, LEWIS & BOCKIUS LLP

(57) ABSTRACT

A method of controlling an electrified vehicle includes determining whether stop control using a motor is possible in a case where a condition for entering stop assist control is satisfied, performing cooperative stop control using the motor and a hydraulic brake upon concluding that the stop control using the motor is possible, and performing independent stop control using the hydraulic brake upon concluding that the stop control using the motor is impossible.

19 Claims, 3 Drawing Sheets

ELECTRIFIED VEHICLE AND METHOD OF CONTROLLING SAME

CROSS-REFERENCE TO RELATED APPLICATION

The present application claims priority to Korean Patent Application No. 10-2023-0070382, filed on May 31, 2023, the entire contents of which is incorporated herein for all purposes by this reference.

BACKGROUND OF THE PRESENT DISCLOSURE

Field of the Present Disclosure

The present disclosure relates to an electrified vehicle and a method of controlling the same for performing stop assist control using a motor and a hydraulic brake.

Description of Related Art

Electrified vehicles can have a stop assist control (SAC) function of allowing the vehicles to stop without brake operation to improve driver convenience. In general, SAC may be performed using only a motor or both a motor and a hydraulic brake.

According to vehicle stop control using both a motor and a hydraulic brake, it is possible to stably perform vehicle stop by supplementing the limitations of vehicle stop control using a motor through brake hydraulic pressure control. However, because brake hydraulic control is subordinate to stop control using a motor, there is a possibility that a situation in which vehicle stop control using a motor is impossible occurs on a road surface with a low coefficient of friction or unevenness. In the instant case, an activated state and a deactivated state of SAC are alternately switched, and thus vehicle stop may be impossible or vehicle slip may occur.

Accordingly, vehicle stop control using only a hydraulic brake when vehicle stop control using a motor is impossible is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing stable stop assist control (SAC) when vehicle stop control using a motor is impossible by performing cooperative stop control using a motor and a hydraulic brake or performing independent stop control using a hydraulic brake depending on whether stop control using a motor may be performed for an electrified vehicle.

Objects to be achieved in an exemplary embodiment of the present disclosure are not limited to the object mentioned above, and other objects that are not mentioned will be clearly understood by those skilled in the art from the description below.

In accordance with an aspect of the present disclosure, the above and other objects may be accomplished by the provision of a method of controlling an electrified vehicle, including determining whether stop control using a motor is possible in a case where a condition for entering stop assist control is satisfied, performing cooperative stop control using the motor and a hydraulic brake upon concluding that the stop control using the motor is possible, and performing independent stop control using the hydraulic brake upon concluding that the stop control using the motor is impossible.

In an exemplary embodiment of the present disclosure, the entry condition may correspond to a condition in which a vehicle speed is equal to or less than a predetermined speed without operation of an accelerator pedal.

In an exemplary embodiment of the present disclosure, the determining may include determining whether the stop control using the motor is possible according to whether or not wheel slip has occurred and motor torque divergence has occurred.

In an exemplary embodiment of the present disclosure, the determining may include determining that stop control using the motor is impossible in a case where wheel slip or motor torque divergence has occurred.

In an exemplary embodiment of the present disclosure, the performing of the independent stop control may be performed in a case where a wheel speed sensor and a brake control unit are in a normal state.

In an exemplary embodiment of the present disclosure, the method may further include transmitting a braking warning in a case where the wheel speed sensor or the brake control unit is in an abnormal state.

In an exemplary embodiment of the present disclosure, the performing of the independent stop control may include determining a target braking torque with reference to a preset control map upon concluding that the stop control using the motor is impossible, and generating a braking force corresponding to the target braking torque using the hydraulic brake.

In accordance with another aspect of the present disclosure, there is provided an electrified vehicle including a brake control unit, a motor control unit, and a vehicle control unit configured to determine whether stop control using a motor is possible in a case where a condition for entering stop assist control is satisfied, to request that the brake control unit and the motor control unit perform cooperative stop control using the motor and a hydraulic brake upon concluding that the stop control using the motor is possible, and to request that the brake control unit perform independent stop control using the hydraulic brake upon concluding that the stop control using the motor is impossible.

In an exemplary embodiment of the present disclosure, the entry condition may correspond to a condition in which a vehicle speed is equal to or less than a predetermined speed without operation of an accelerator pedal.

In an exemplary embodiment of the present disclosure, the vehicle control unit may be configured to determine whether stop control using the motor is possible according to whether or not wheel slip has occurred and motor torque divergence has occurred.

In an exemplary embodiment of the present disclosure, the vehicle control unit may be configured to determine that stop control using the motor is impossible in a case where wheel slip or motor torque divergence has occurred.

In an exemplary embodiment of the present disclosure, the vehicle control unit may be configured to request that the brake control unit perform the independent stop control in a case where a wheel speed sensor and the brake control unit are in a normal state.

In an exemplary embodiment of the present disclosure, the vehicle control unit may be configured to request transmission of a braking warning in a case where the wheel speed sensor or the brake control unit is in an abnormal state.

In an exemplary embodiment of the present disclosure, the vehicle control unit may be configured to determine a target braking torque with reference to a preset control map upon concluding that the stop control using the motor is impossible, and the brake control unit may be configured to perform control so that a braking force corresponding to the target braking torque is generated using the hydraulic brake.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
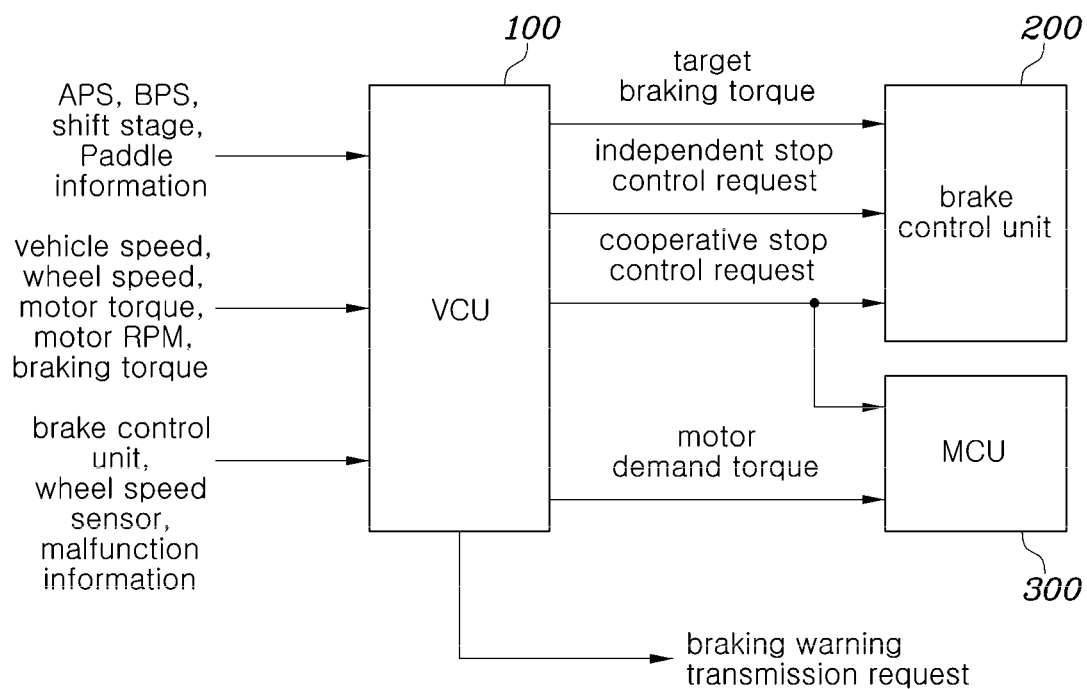
FIG. 1 is a block diagram showing a configuration of an electrified vehicle according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings, but the same or similar components are denoted by the same reference numerals and redundant descriptions thereof will be omitted.

In the following description of the exemplary embodiments included in the present specification, a detailed description of known functions and configurations incorporated herein will be omitted when it may obscure the subject matter of the present disclosure. Furthermore, the accompanying drawings are provided only for ease of understanding of the exemplary embodiments included in the present specification, do not limit the technical spirit included herein, and include all changes, equivalents and substitutes included in the spirit and scope of the present disclosure.

In the description of the following embodiments, the term "predetermined" means that the value of a parameter is predetermined when the parameter is used in a process or an algorithm. The value of a parameter may be set when a process or an algorithm starts or may be set during a period in which a process or an algorithm is performed according to various exemplary embodiments of the present disclosure.

The suffixes "module" and "part" of elements herein are used for convenience of description and thus may be used interchangeably and do not have any distinguishable meanings or functions.

The terms "first" and/or "second" are used to describe various components, but such components are not limited by these terms. The terms are used to discriminate one component from another component, When a component is "coupled" or "connected" to another component, it should be understood that a third component may be present between the two components although the component may be directly coupled or connected to the other component. When a component is "directly coupled" or "directly connected" to another component, it should be understood that no element is present between the two components.

An element described in the singular form is directed to include a plurality of elements unless the context clearly indicates otherwise.

In the present specification, it will be further understood that the term "comprise" or "include" specifies the presence of a stated feature, figure, step, operation, component, part or combination thereof, but does not preclude the presence or addition of one or more other features, figures, steps, operations, components, or combinations thereof.

Furthermore, a unit or a control unit included in the names of a motor control unit (MCU), a hybrid control unit (HCU), and the like is only a term widely used to name a controller that is configured to control a specific vehicle function and does not mean a generic functional unit. For example, each controller may include a communication device that communicates with other controllers or sensors to control functions of the controller, a memory that stores an operating system or logic commands and input/output information, and one or more processors that perform determination, operation, and decision necessary to control the functions.

In an exemplary embodiment of the present disclosure, an electrified vehicle that provides a stop assist control (SAC) function of allowing the electrified vehicle to stop without brake operation to improve driver convenience will be described.

An electrified vehicle according to an exemplary embodiment of the present disclosure can stably assist stop in a situation in which stop control using a motor is impossible by performing cooperative stop control using a motor and a hydraulic brake or performing independent stop control using a hydraulic brake depending on whether stop control using the motor is possible. A configuration for this is illustrated in FIG. 1.

FIG. 1 is a block diagram showing a configuration of an electrified vehicle according to an exemplary embodiment of the present disclosure.

Referring to FIG. 1, an electrified vehicle according to an exemplary embodiment of the present disclosure includes a vehicle control unit (VCU) 100, a brake control unit 200, and a motor control unit (MCU) 300. The brake control unit 200 may be configured for controlling hydraulic braking using a hydraulic brake, and the motor control unit 300 may be configured for controlling regenerative braking using a motor.

The vehicle control unit 100 may receive a detected value of an accelerator pedal sensor (APS), a detected value of a brake pedal sensor (BPS), and shifting stage and paddle information to determine a driver's driving intention and may receive a vehicle speed, a wheel speed, a motor torque, a motor speed (RPM), and a braking torque to determine a vehicle state. Furthermore, the vehicle control unit 100 may receive malfunction information on the brake control unit 200 and a wheel speed sensor to determine whether or not to transmit a braking warning which will be described later.

The vehicle control unit 100 may be configured to determine whether stop control using a motor is possible when a condition for entering stop assist control (SAC) is satisfied in a preset driving situation. In the instant case, the preset driving situation may correspond to a pedal drive (OPD) situation in which a vehicle speed is adjusted with an accelerator pedal to produce a regenerative braking effect in a state where a brake pedal is not used, or a situation in which a mode supporting OPD is performed.

The condition for entering SAC may correspond to a condition in which the vehicle speed is equal to or less than a preset speed without operation of the accelerator pedal. For example, the condition for entering SAC may be satisfied in a case where the state of the accelerator pedal sensor is OFF and the vehicle speed is 3 kph or less.

When the condition for entering SAC is satisfied, the vehicle control unit 100 may request that the brake control unit 200 execute SAC, and determine whether stop control is possible in the state in which SAC has been requested.

At the present time, the vehicle control unit 100 may be configured to determine whether or not stop control using the motor is possible according to whether wheel slip has occurred and whether a motor torque has diverged. The vehicle control unit 100 may be configured to determine that stop control using the motor is impossible in a case where wheel slip or motor torque divergence has occurred. On the other hand, the vehicle control unit 100 may be configured to determine that stop control using the motor is possible in a case where wheel slip and divergence of motor torque have not occurred. A method for the vehicle control unit 100 to determine whether wheel slip has occurred is set in various manners according to various exemplary embodiments of the present disclosure, and whether or not motor torque divergence has occurred may be determined by a disturbance observer (DOB). Since the disturbance observer (DOB) is generally known, detailed explanation is omitted.

Thereafter, the vehicle control unit 100 may request that the brake control unit 200 perform independent stop control using the hydraulic brake or may request that the brake control unit 200 and the motor control unit 300 perform cooperative stop control using the motor and hydraulic brake depending on whether or not stop control using the motor is possible. Upon reception of the request for cooperative stop control, the brake control unit 200 and the motor control unit 300 may unidirectionally or bidirectionally transmit information for stop control through the vehicle control unit 100.

Upon determining that stop control using the motor is possible, the vehicle control unit 100 may request that the brake control unit 200 and the motor control unit 300 perform cooperative stop control using the motor and the hydraulic brake. At the time of requesting cooperative stop control, the vehicle control unit 100 may be configured to determine a motor demand torque for regenerative braking of the motor from a total braking demand according to a value detected by the brake pedal sensor (BPS), transmit the same to the motor control unit 300, and transmit a target braking torque corresponding to the difference between the total braking demand and a regenerative braking amount of the motor to the brake control unit 200. In the case of cooperative stop control, the motor control unit 300 may transmit the actual regenerative braking amount of the motor based on the state of charge (SOC) value of the battery to the vehicle control unit 100, and the vehicle control unit 100 may transmit the target braking torque corresponding to the difference between the total braking demand and the actual regenerative braking amount of the motor to the brake control unit 200.

On the other hand, upon determining that stop control using the motor is impossible, the vehicle control unit 100 may request that the brake control unit 200 perform independent stop control using the hydraulic brake. At the instant time, upon determining that stop control using the motor is impossible, the vehicle control unit 100 may be configured to determine a target braking torque with reference to a preset control map, and the brake control unit 200 may perform control so that a braking force corresponding to the target braking torque is generated using the hydraulic brake.

According to an exemplary embodiment of the present disclosure, independent stop control using the hydraulic brake may be performed in a case where the wheel speed sensor and the brake control unit 200 are in a normal state. The vehicle control unit 100 may be configured to determine whether or not the states of the wheel speed sensor and the brake control unit 200 are normal upon determining that stop control using the motor is impossible. If the states of the wheel speed sensor and the brake control unit 200 are normal, the vehicle control unit 100 may request that the brake control unit 200 perform independent stop control using the hydraulic brake. On the other hand, if the states of the wheel speed sensor and the brake control unit 200 are abnormal, the vehicle control unit 100 may request transmission of a braking warning from a notification control unit. Here, the abnormal state of the wheel speed sensor may include a case where the detected value of the wheel speed sensor has an error of more than a preset range from the actual wheel speed, and the abnormal state of the brake control unit 200 may include a case where the brake controller does not perform determination or control corresponding to a control command input from the other controller (ex. vehicle control unit 100). And, the normal state of the wheel speed sensor and the brake control unit 200 means a case where the wheel speed sensor and the brake control unit 200 are not in the abnormal state.

According to an exemplary embodiment of the present disclosure, each of the vehicle control unit (VCU) 100, the brake control unit 200, and the motor control unit 300, may be a processor (e.g., computer, microprocessor, CPU, ASIC, circuitry, logic circuits, etc.) Alternatively, the vehicle control unit (VCU) 100, the brake control unit 200, and the motor control unit 300 may be integrated in a single processor.

Figure 2:
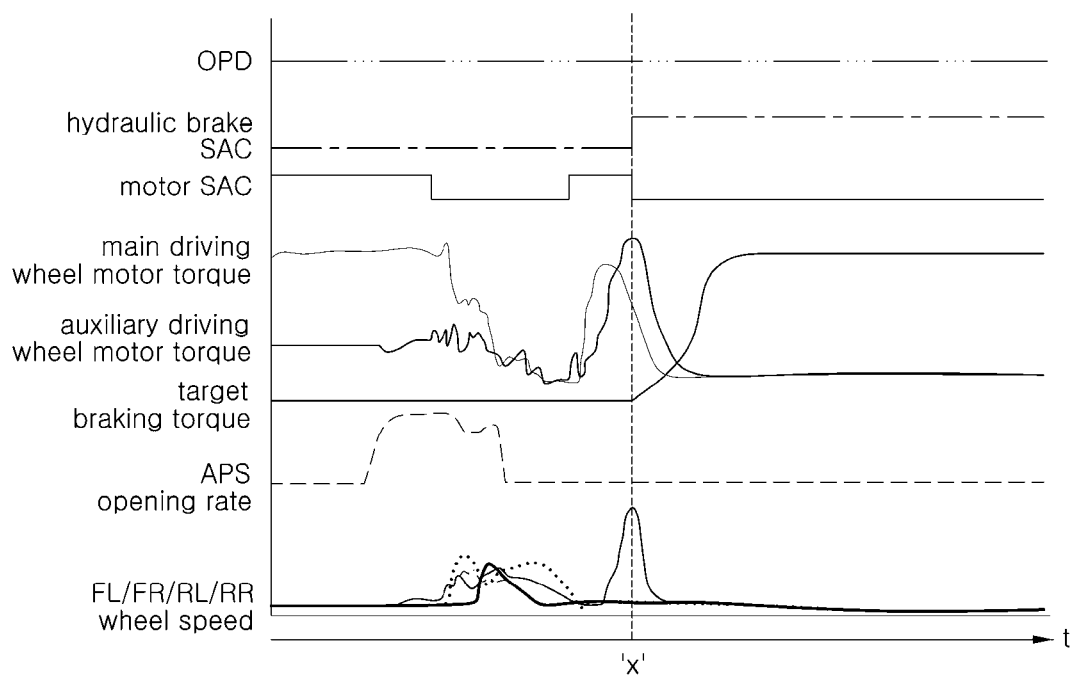
FIG. 2 is a diagram illustrating a process of performing stop assist control according to an exemplary embodiment of the present disclosure.

FIG. 2 is a diagram illustrating a process of performing stop assist control according to an exemplary embodiment of the present disclosure.

FIG. 2 is a diagram assuming a situation in which wheel slip occurs at a time "x" when an electrified vehicle enters SAC according to an exemplary embodiment of the present disclosure. To enter SAC, activation of one pedal drive (OPD) may be required.

At the time "x," SAC using the motor may be deactivated, and SAC using the hydraulic brake may be activated. At the instant time, a target braking torque may be determined based on a separate control map in the vehicle control unit 100, and a main driving wheel motor torque and an auxiliary driving wheel motor torque may be controlled by an amount corresponding to the target braking torque.

At the time "x," the opening rate of the accelerator pedal sensor (APS) corresponds to "0" and the speed of at least one of the front left (FL) wheel, front right (FR) wheel, rear left (RL) wheel, and rear right (RR) wheel may change rapidly. The electrified vehicle according to the exemplary embodiment can stably control the rapidly changing wheel speed through SAC using the hydraulic brake.

Figure 3:
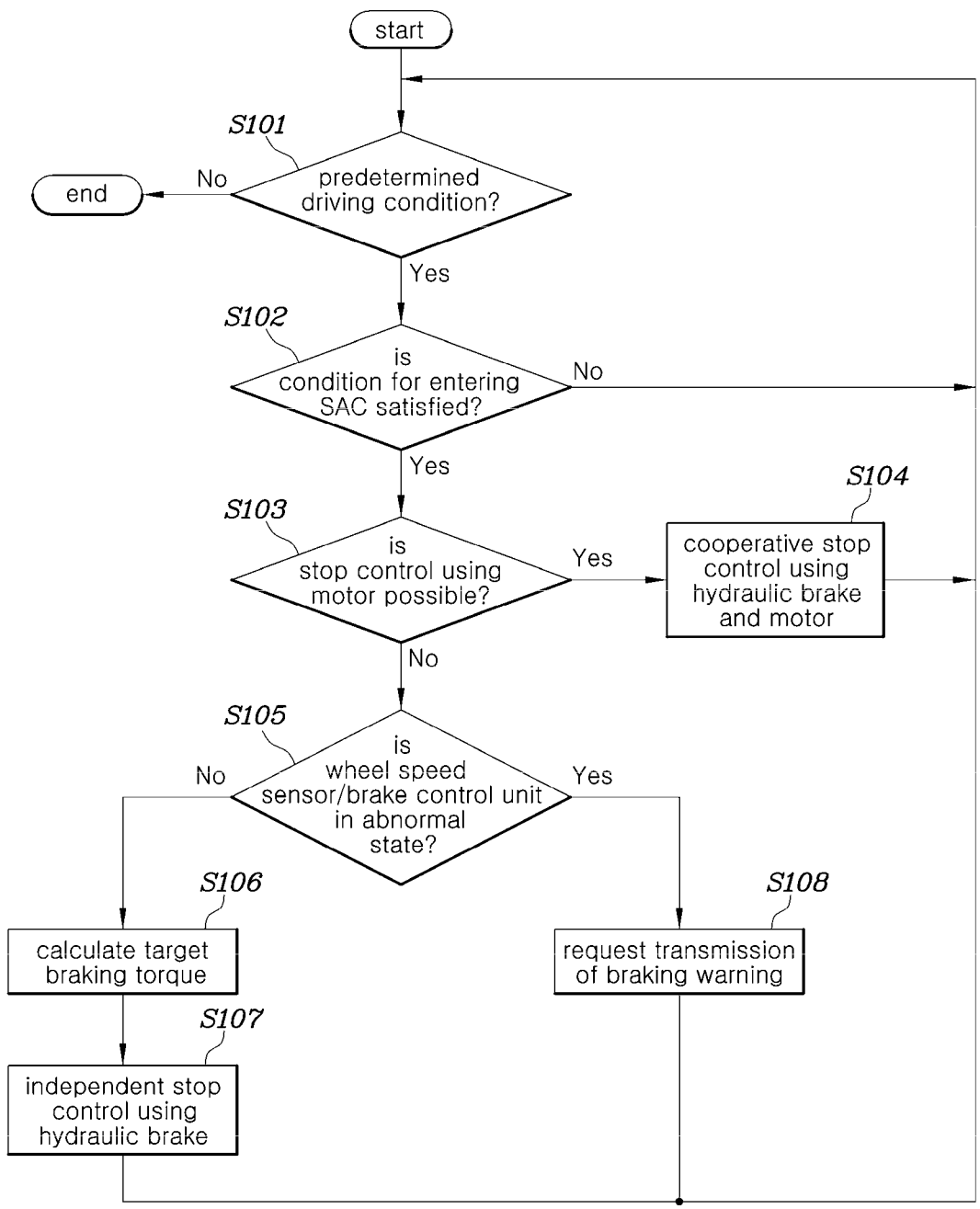
FIG. 3 is a flowchart illustrating a method of controlling an electrified vehicle according to an exemplary embodiment of the present disclosure.

FIG. 3 is a flowchart illustrating a method of controlling an electrified vehicle according to an exemplary embodiment of the present disclosure.

Referring to FIG. 3, the vehicle control unit 100 may be configured to determine whether or not the current situation is a preset driving situation before determining whether a condition for entering SAC is satisfied (S101). In an exemplary embodiment of the present disclosure, the preset driving situation may correspond to one pedal drive (OPD) situation in which a regenerative braking effect is achieved by adjusting a vehicle speed with the accelerator pedal in a state where the brake pedal is not used, or a situation in which a mode supporting the OPD is performed. If the current situation is not the preset driving condition (NO in S101), control of the electrified vehicle according to the exemplary embodiment may be terminated.

Thereafter, the vehicle control unit 100 may be configured to determine whether the condition for entering SAC is satisfied if the current situation is the preset driving situation (YES in S101) (S102). As described above, the condition for entering SAC may correspond to a condition in which the vehicle speed is equal to or less than a preset speed without operation of the accelerator pedal. For example, the condition for entering SAC may be satisfied when the state of the accelerator pedal sensor is OFF and the vehicle speed is 3 kph or less. If the condition for entering SAC is not satisfied (NO in S102), step S101 may be re-performed.

The vehicle control unit 100 may be configured to determine whether or not stop control using the motor is possible if the condition for entering SAC is satisfied (YES in S102) in the preset driving situation (S103). In the instant case, whether or not stop control using the motor is possible may be determined according to whether or not wheel slip has occurred and whether or not a motor torque has diverged. The vehicle control unit 100 may be configured to determine that stop control using the motor is impossible in a case where wheel slip or motor torque divergence has occurred, and determine that stop control using the motor is possible in a case where wheel slip or motor torque divergence has not occurred.

Upon determining that stop control using the motor is possible (YES in S103), the vehicle control unit 100 may request that the brake control unit 200 and the motor control unit 300 perform cooperative stop control using the motor and the hydraulic brake (S104). As described above, the motor control unit 300 may receive a motor demand torque for regenerative braking of the motor from the vehicle control unit 100, and the brake control unit 200 may receive a target braking torque corresponding to a total braking demand and the (actual) regenerative braking amount of the motor from the vehicle control unit 100 in S104.

On the other hand, upon determining that stop control using the motor is impossible (NO in S103), the vehicle control unit 100 may be configured to determine whether the wheel speed sensor and the brake control unit 200 are in an abnormal state (S105). Here, the abnormal state of the wheel speed sensor may include a case where the detected value of the wheel speed sensor has an error of more than a preset range from the actual wheel speed, and the abnormal state of the brake control unit 200 may include a case where the brake controller does not perform determination or control corresponding to a control command input from the other controller (ex. vehicle control unit 100). And, the normal state of the wheel speed sensor and the brake control unit 200 means a case where the wheel speed sensor and the brake control unit 200 are not in the abnormal state.

In a case where the states of the wheel speed sensor and the brake control unit 200 are normal (NO in S105), the vehicle control unit 100 may be configured to determine a target braking torque with reference to a preset control map (S106) and request that the brake control unit 200 perform independent stop control using the hydraulic brake (S107). At the instant time, the brake control unit 200 may perform control so that a braking force corresponding to the target braking torque is generated using the hydraulic brake. Here, the request for independent stop control using the hydraulic brake may be maintained until the electrified vehicle is stopped even if the situation in which stop control using the motor is impossible ends. The preset control map may be configured separately in consideration of a gradient of road or the like. Accordingly, when wheel slip occurs due to road conditions while SAC is being performed, the electrified vehicle according to the exemplary embodiment can stop vehicle stop control using the motor and perform independent stop control using the hydraulic brake.

On the other hand, in a case where the states of the wheel speed sensor and the brake control unit 200 are abnormal (YES in S105), the vehicle control unit 100 may request transmission of a braking warning from a notification control unit (S108). Accordingly, in a case where a malfunction has occurred in the wheel speed sensor and the brake control unit, the electrified vehicle according to the exemplary embodiment can warn the driver of the malfunction through warning text or the like, preventing accidents. For example, the electrified vehicle according to the exemplary embodiment may warn the driver by visually provide the warning text through a display provided in the vehicle or audibly providing the warning text through a speaker provided in the vehicle.

As described above, the electrified vehicle according to an exemplary embodiment of the present disclosure can perform cooperative stop control using the motor and the hydraulic brake or perform independent stop control using the hydraulic brake depending on whether or not stop control using the motor is possible so that stable stop assist control may be performed in a situation in which stop control using the motor is not possible.

The present disclosure described above may be implemented as computer-readable code on a medium in which a program is recorded. Computer readable media include all kinds of recording devices in which data readable by a computer system is stored. Examples of computer-readable media include a Hard Disk Drive (HDD), a solid state drive (SSD), a silicon disk drive (SDD), a ROM, a RAM, a CD-ROM, a magnetic tape, a floppy disk, an optical data non-transitory storage device, etc. Accordingly, the above detailed description should not be construed as restrictive in all respects but as exemplary. The scope of the present disclosure should be determined by a reasonable interpretation of the appended claims, and all modifications within the equivalent scope of the present disclosure are within the scope of the present disclosure.

According to an exemplary embodiment of the present disclosure, it is possible to achieve stable stop assist control (SAC) when vehicle stop control using a motor is impossible by performing cooperative stop control using a motor and a hydraulic brake or performing independent stop control using a hydraulic brake depending on whether stop control using a motor may be performed for an electrified vehicle.

The effects which may be obtained in an exemplary embodiment of the present disclosure are not limited to the effects mentioned above, and other effects that are not mentioned may be clearly understood by those skilled in the art from the description below:

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling a vehicle, the method comprising:

determining, by a controller, whether stop control using a motor is possible in response that an entry condition for entering stop assist control is satisfied;

performing, by the controller, cooperative stop control using the motor and a hydraulic brake upon concluding that the stop control using the motor is possible; and performing, by the controller, independent stop control using the hydraulic brake upon concluding that the stop control using the motor is impossible.

2. The method of claim 1, further including determining whether a predetermined driving condition is satisfied, before the determining of whether the stop control using the motor is possible, wherein the preset driving situation corresponds to one pedal drive (OPD) situation in which a regenerative braking effect is achieved by adjusting a vehicle speed with an accelerator pedal in a state where a brake pedal is not used, or a situation in which a mode supporting the OPD is performed.

3. The method of claim 1, wherein the entry condition corresponds to a condition in which a vehicle speed is equal to or less than a predetermined speed without operation of an accelerator pedal in the vehicle.

4. The method of claim 1, wherein the determining includes determining whether the stop control using the motor is possible according to whether or not wheel slip has occurred and motor torque divergence has occurred.

5. The method of claim 4, wherein the controller is configured for determining that the stop control using the motor is impossible in response that the wheel slip or the motor torque divergence has occurred.

6. The method of claim 4, wherein the controller is configured for determining that the stop control using the motor is possible in response that the wheel slip or the motor torque divergence has not occurred.

7. The method of claim 1, wherein in the performing of the independent stop control, the independent stop control is performed in response that a wheel speed sensor and a brake control unit are in a normal state.

8. The method of claim 7, further including transmitting a braking warning in response that the wheel speed sensor or the brake control unit is in an abnormal state.

9. The method of claim 1, wherein the performing of the independent stop control includes:

determining a target braking torque with reference to a preset control map upon concluding that the stop control using the motor is impossible; and generating a braking force corresponding to the target braking torque using the hydraulic brake.

10. A non-transitory computer-readable recording medium recording a program for executing the method of controlling the vehicle of claim 1.

11. A vehicle comprising:
a brake control unit;
a motor control unit; and
a vehicle control unit configured to determine whether stop control using a motor is possible in a case where an entry condition for entering stop assist control is satisfied, to request that the brake control unit and the motor control unit perform cooperative stop control using the motor and a hydraulic brake upon concluding that the stop control using the motor is possible, and to request that the brake control unit perform independent stop control using the hydraulic brake upon concluding that the stop control using the motor is impossible.

12. The electrified vehicle of claim 11, wherein the vehicle control unit is configured to determine whether a predetermined driving condition is satisfied, before the determining of whether the stop control using the motor is possible, wherein the preset driving situation corresponds to one pedal drive (OPD) situation in which a regenerative braking effect is achieved by adjusting a vehicle speed with an accelerator pedal in a state where a brake pedal is not used, or a situation in which a mode supporting the OPD is performed.

13. The electrified vehicle of claim 11, wherein the entry condition corresponds to a condition in which a vehicle speed is equal to or less than a predetermined speed without operation of an accelerator pedal.

14. The electrified vehicle of claim 11, wherein the vehicle control unit is configured to determine whether stop control using the motor is possible according to whether or not wheel slip has occurred and motor torque divergence has occurred.

15. The electrified vehicle of claim 14, wherein the controller is configured for determining that the stop control using the motor is possible in response that the wheel slip or the motor torque divergence has not occurred.

16. The electrified vehicle of claim 14, wherein the vehicle control unit is configured to determine that the stop control using the motor is impossible in response that the wheel slip or the motor torque divergence has occurred.

17. The electrified vehicle of claim 11, wherein the vehicle control unit is configured to request that the brake control unit perform the independent stop control in response that a wheel speed sensor and the brake control unit are in a normal state.

18. The electrified vehicle of claim 17, wherein the vehicle control unit is configured to request transmission of a braking warning in response that the wheel speed sensor or the brake control unit is in an abnormal state.

19. The electrified vehicle of claim 11, wherein the vehicle control unit is configured to determine a target braking torque with reference to a preset control map upon concluding that the stop control using the motor is impossible, and the brake control unit is configured to perform control so that a braking force corresponding to the target braking torque is generated using the hydraulic brake.

* * * * *